(No Model.)
J. BEARMAN.
PEA HARVESTER.
No. 503,031.   Patented Aug. 8, 1893.
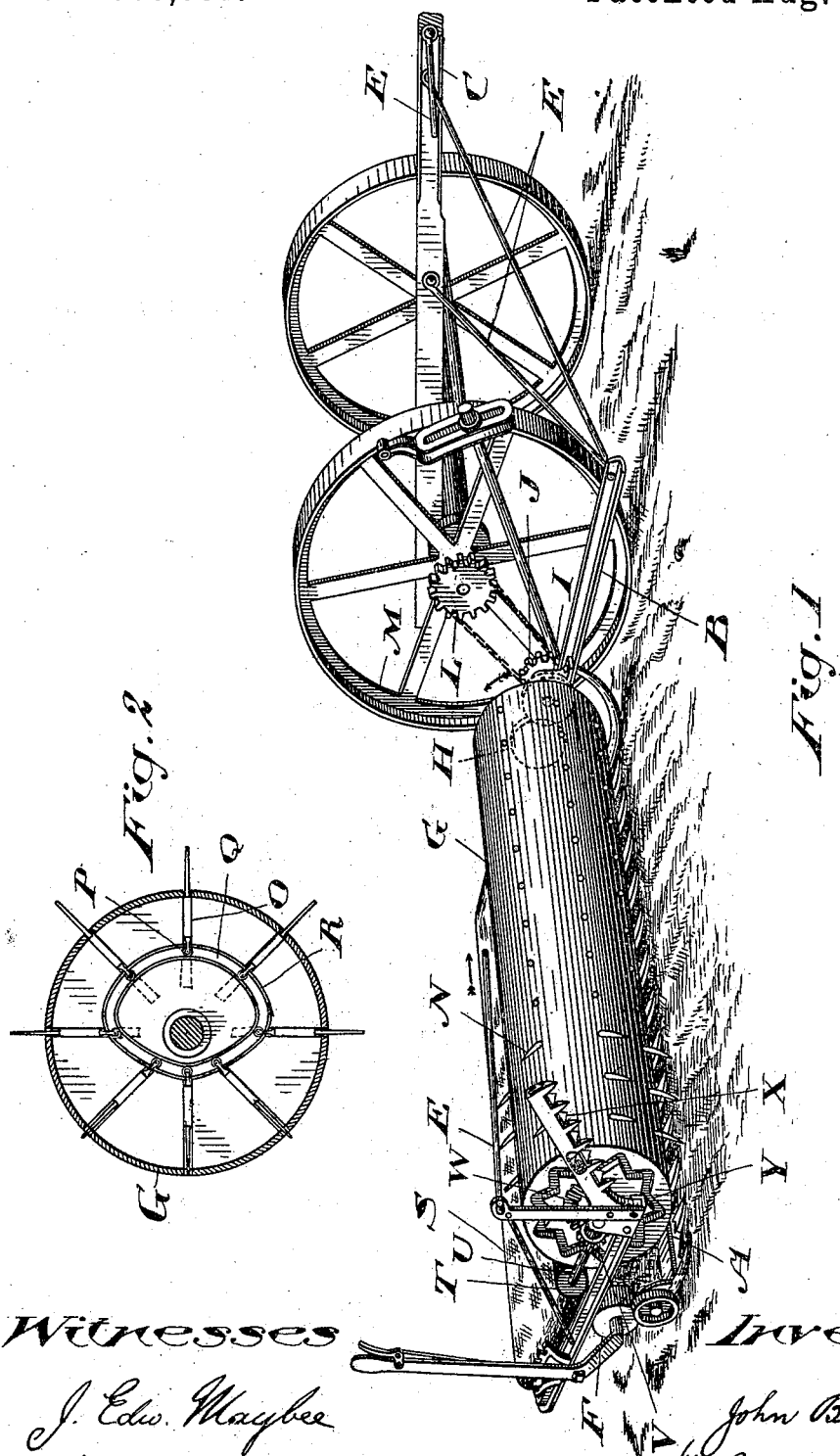

(No Model.) 2 Sheets—Sheet 2.
J. BEARMAN.
PEA HARVESTER.
No. 503,031. Patented Aug. 8, 1893.
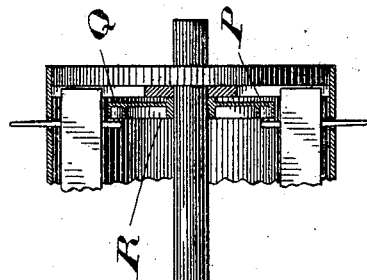
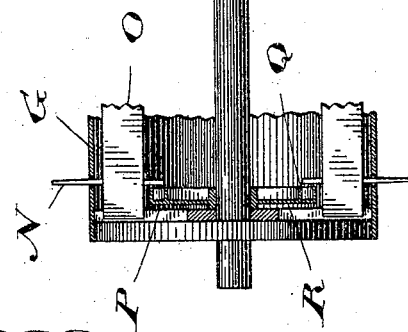
Fig. 3

UNITED STATES PATENT OFFICE.

JOHN BEARMAN, OF ELDERSLIE, CANADA.

PEA-HARVESTER.

SPECIFICATION forming part of Letters Patent No. 503,031, dated August 8, 1893.

Application filed March 7, 1893. Serial No. 465,056. (No model.)

*To all whom it may concern:*

Be it known that I, JOHN BEARMAN, of the township of Elderslie, in the county of Bruce and Province of Ontario, Canada, have invented a certain new and Improved Pea-Harvester, of which the following is a specification.

The object of the invention is to provide a simple and effective attachment for a mowing machine by which peas may be readily and effectually harvested, and it consists, of a revolving toothed roller suspended over the cutter bar and provided with fingers arranged to raise the straw from the ground and elevate it after it has been separated by the cutter bar and deposit the same upon a traveling apron arranged to remove the straw out of the path of the roller, means being provided for the purpose of throwing the fingers into action and withdrawing the same at the time that the straw is deposited upon the traveling apron, the machine being otherwise constructed in detail, substantially as hereinafter more particularly explained.

Figure 1, is a perspective view of my improved pea-harvesting attachment applied to a rear cut mower. Fig. 2, is a sectional detail of the roller. Fig. 3 is a longitudinal section showing the rings, fingers, &c.

A, is the cutter bar of an ordinary mower. This cutter bar is attached and operated in any of the ordinary ways.

B, is a light metal frame braced to the tongue C, by the rods E, or in any other suitable manner. This frame is carried by the wheels F, located one at each end of the frame and which are preferably made adjustable so that the height of the frame may be regulated. (Only one of these wheels is seen in the drawings.) A hollow cylinder or roller G, is suitably journaled on the frame B, and has a spur wheel H, fixed to it. This spur wheel meshes with a spur wheel I, connected to a spindle suitably journaled on the frame B, which spindle has a sprocket wheel J, fixed to it. This sprocket wheel is connected to a sprocket wheel L, fixed to and revolving with the mower wheel M. In consequence of this connection, the hollow cylinder or roller G, will revolve in the direction indicated by arrow, as the machine moves forward.

A series of fingers N, project from the hollow cylinder or roller G. These fingers are connected and operated as follows:—It will be observed that these fingers are arranged in rows; each row of fingers N, is connected to a bar O, (see Fig. 2) suitably supported by the friction rollers P, resting in cam grooves Q, formed in the stationary rings R, which rings are securely fastened to the shaft of the roller G, the shaft and rings being stationary. The cam grooves Q, are formed so that the fingers N, are thrown out as they approach the cutter bar A, and after reaching a point past the top of the hollow cylinder or roller G, where they discharge the straw onto the traveling apron S, are drawn back below the surface of the cylinder or roller G, and thus are removed from any danger of becoming entangled with the straw. The said traveling apron is supported by suitable rollers T, journaled in bearings carried by the frame B. The spindle U of one of the rollers T, has a bevel pinion V, fixed to it, which bevel pinion meshes with a bevel spur wheel W, fixed to the revolving cylinder or roller G. In this way the traveling apron S, constantly moves in the direction indicated by arrows as long as the machine is moving forward, and consequently as the straw falls upon the apron, it is carried clear of the machine, leaving a clear space for the horses as they move the machine for the next swath.

In order to completely separate the standing straw from the straw being cut, I provide a supplemental cutter bar X. This cutter bar is caused to operate by its wrist pin fitting into a cam groove Y, formed on the end of the hollow cylinder G. From this description it will be seen that I provide a very simple and effective pea straw harvester.

What I claim as my invention is—

1. In a harvester a revolving cylinder or roller suspended above the cutter bar and revolving in a direction opposite to that of the driving wheels, and fingers projecting from said rollers, in combination with a traveling apron set in proximity to a revolving cylinder or roller and made to travel at right angles to the forward movement of the machine, substantially as and for the purpose specified.

2. In a harvester a revolving cylinder or roller suspended above the cutter bar and revolving in a direction opposite to that of the driving wheels, fingers projecting from said roller and arranged in rows and mechanism by which said fingers are at stated intervals made to protrude from and recede into the surface of the cylinder or roller in combination with a traveling apron set in proximity to a revolving cylinder or roller and made to travel at right angles to the forward movement of the machine, substantially as and for the purpose specified.

3. A revolving cylinder or roller suspended above the cutter bar and provided with fingers arranged in rows and with mechanism by which they are at stated intervals made to protrude from and recede into the surface of the cylinder or roller, a supplemental finger bar projecting in front of and at the end of the frame B, above the cutter bar A, in combination with mechanism for operating the knife of the said cutter bar, substantially as and for the purpose specified.

Toronto, February 16, 1893.

JOHN BEARMAN.

In presence of—
J. EDW. MAYBEE,
THOS. ERNEST.